United States Patent
Vissiere et al.

(10) Patent No.: US 11,519,728 B2
(45) Date of Patent: Dec. 6, 2022

(54) METHOD FOR ESTIMATING THE MOVEMENT OF AN OBJECT MOVING IN A MAGNETIC FIELD

(71) Applicant: SYSNAV, Vernon (FR)

(72) Inventors: David Vissiere, Paris (FR);
Charles-Ivan Chesneau, Paris (FR);
Mathieu Hillion, Vernon (FR);
Christophe Prieur, Eybens (FR)

(73) Assignee: SYSNAV, Vernon (FR)

( * ) Notice: Subject to any disclaimer, the term of this patent is extended or adjusted under 35 U.S.C. 154(b) by 338 days.

(21) Appl. No.: 16/632,288

(22) PCT Filed: Jul. 19, 2018

(86) PCT No.: PCT/FR2018/051837
§ 371 (c)(1),
(2) Date: Jan. 17, 2020

(87) PCT Pub. No.: WO2019/016474
PCT Pub. Date: Jan. 24, 2019

(65) Prior Publication Data
US 2020/0408527 A1 Dec. 31, 2020

(30) Foreign Application Priority Data
Jul. 21, 2017 (FR) ...................................... 1756958

(51) Int. Cl.
*G01C 21/08* (2006.01)
*G01C 21/16* (2006.01)

(52) U.S. Cl.
CPC ........... *G01C 21/08* (2013.01); *G01C 21/165* (2013.01)

(58) Field of Classification Search
CPC ...... G01C 21/12; G01C 22/006; G01C 21/16; G01C 21/20; G01C 21/206; G01C 25/005;
(Continued)

(56) References Cited

U.S. PATENT DOCUMENTS 8,065,074 B1 * 11/2011 Liccardo ............. G01C 21/165
73/504.03
8,761,439 B1 * 6/2014 Kumar ..................... G06T 7/73
382/103
(Continued)

FOREIGN PATENT DOCUMENTS

EP 2541199 A1 1/2013
FR 2914739 A1 * 10/2008 ........... G01C 21/165
(Continued)

OTHER PUBLICATIONS

Dorveaux et al., "Combining inertial measurements and distributed magnetometry for motion estimation", 2011 American Control Conference, Jun. 29-Jul. 1, 2011, IEEE, pp. 4249-4256.
(Continued)

*Primary Examiner* — Nimeshkumar D Patel
*Assistant Examiner* — Gedeon M Kidanu
(74) *Attorney, Agent, or Firm* — Womble Bond Dickinson (US)

(57) ABSTRACT

A method for estimating the movement of an object moving in an ambient magnetic field. The method acquires at least one component of the magnetic field and/or an i-th derivative of the magnetic field measures at least one item of information representative of the movement of the object; evaluates the stationary or otherwise character of the magnetic field; estimates at least one component of the movement of the object using at least one equation other than magnetic linking the component of the movement of the
(Continued)

object and the at least one acquired item of information representative of the movement of the object depending on the result of the evaluation at least one magnetic equation linking the component of the movement of the object and the at least one acquired component of the magnetic field and/or an i-th derivative of the magnetic field.

16 Claims, 4 Drawing Sheets

(58) Field of Classification Search
CPC ........ G01C 9/00; G01C 21/005; G01C 21/08; G01C 21/165; G01P 13/00; G01P 15/00; G06F 1/163; A63B 24/0003; A63B 24/0062; G01L 5/0095; G01S 19/19; G01S 19/49; G16H 20/30; G16H 40/67; A61B 2562/0219; A61B 5/681; A61B 5/6824; A61B 5/002; A61B 5/112; A61B 5/7278; A61B 5/0022; A61B 5/024; A61B 5/1124; A61B 5/7235; A61B 5/742; A61B 2090/067; A61B 2503/10; A61B 2505/09; A61B 2562/04; A61B 5/02405; A61B 5/02438; A61B 5/1071; A61B 5/11; A61B 5/1112; A61B 5/1114; A61B 5/1118; A61B 5/1121; A61B 5/1122; A61B 5/224; A61B 5/4585; A61B 5/6801; A61B 5/6823; A61B 5/6828; A61B 5/6829; A61B 5/7275
See application file for complete search history.

(56) References Cited

U.S. PATENT DOCUMENTS

| | | | | |
|---|---|---|---|---|
| 9,173,596 | B1 * | 11/2015 | Berme | A61B 5/0024 |
| 10,126,427 | B2 * | 11/2018 | Pekonen | G01C 25/005 |
| 10,709,382 | B2 * | 7/2020 | Karavirta | A61B 5/112 |
| 11,099,029 | B2 * | 8/2021 | Vissiere | G01C 22/006 |
| 2013/0218451 | A1 * | 8/2013 | Yamada | G01C 21/08 701/409 |
| 2016/0353995 | A1 * | 12/2016 | Oleson | A61B 5/1118 |
| 2018/0292230 | A1 * | 10/2018 | Vissiere | G01C 21/206 |
| 2019/0029605 | A1 * | 1/2019 | Grelet | A61B 5/1124 |
| 2019/0133498 | A1 * | 5/2019 | Vissiere | A61B 5/1124 |
| 2020/0329998 | A1 * | 10/2020 | Romrell | A61B 5/7278 |
| 2020/0337598 | A1 * | 10/2020 | Romrell | A61B 5/112 |

FOREIGN PATENT DOCUMENTS

| | | |
|---|---|---|
| FR | 2914739 A1 | 10/2008 |
| FR | 3069053 A1 | 1/2019 |

OTHER PUBLICATIONS

Dorveaux, Eric, "Magneto-inertial navigation: principles and application to an indoor pedometer", HAL, Available Online at <https://pastel.archives-ouvertes.fr/pastel-00677137/document>, Nov. 10, 2011, 142 pages.
International Preliminary Report on Patentability received for PCT Patent Application No. PCT/FR2018/051837, dated Jan. 30, 2020, 19 pages (10 pages of English Translation and 9 pages of Original Document).
International Search Report and Written Opinion received for PCT Patent Application No. PCT/FR2018/051837, dated Sep. 27, 2018, 23 pages (11 pages of English Translation and 12 pages of Original Document).
Praly et al., "Using distributed magnetometry in navigation of heavy launchers and space vehicles", 4th European Conference for Aerospace Sciences (EUCASS), Aug. 30, 2011, pp. 1-8.

* cited by examiner

METHOD FOR ESTIMATING THE MOVEMENT OF AN OBJECT MOVING IN A MAGNETIC FIELD

GENERAL TECHNICAL FIELD

The present invention relates to the field of navigation without GPS.

More precisely, it relates to a method for estimating the movement of an object by magneto-inertial techniques.

PRIOR ART

So-called magneto-inertial navigation techniques make it possible to estimate precisely the velocity (and therefrom, by integration, the position) of a solid in a place where the magnetic field is disturbed.

Precisely, it has been proposed in the patent FR2914739 to use, as a complement to the equations already used in conventional magneto-inertial techniques, the equation $\dot{B}=-\Omega\wedge B+\nabla B\cdot V$ to estimate the (linear) velocity vector V, from the angular velocity vector $\Omega$ (generally measured by gyrometers of the inertial unit), measurements of magnetic field B and its derivatives with respect to time $\dot{B}$ and its spatial derivatives $\nabla B$ (gradient), measured or estimated.

Thanks to this information on the velocity of the solid, the error on the estimation of position will be in the worst of cases proportional to time, unlike conventional inertial techniques where it is quadratic in time.

These magneto-inertial techniques thereby provide entire satisfaction, and require inertial sensors of lower performance than conventional inertial methods (based on integration through a Kalman filter or another observer of information coming from gyrometers and accelerometers embedded on the solid of which it is wished to estimate the position and the velocity: typically, the gyrometers "maintain" a frame of reference, in which a double temporal integration of the measurements of the accelerometers makes it possible to estimate the movement) and are thus less bulky.

Thus, at least one inertial unit is coupled to one or more magnetometers distributed spatially (typically magnetometers arranged on the summits of a right-handed trihedron) and fixed with respect to the inertial unit (typically placed at the origin of the trihedron). The data coming from these sensors are transmitted to an electronic acquisition and calculation card which delivers position and velocity information to the user by resolution of the aforementioned equation. The use of several magnetometers makes it possible to measure directly the magnetic field gradients for example by finite difference (Taylor development), instead of estimating them.

However, the equation $\dot{B}=-\Omega\wedge B+\nabla B\cdot V$ is only really valid in the hypothesis of a stationary ambient magnetic field. More precisely, they have in reality a supplementary term $$\frac{\partial B}{\partial t},$$

zero when the field is stationary.

This is not for example the case when a metal object moves nearby. In the presence of such a magnetic disturbance (the magnetic field becomes non-stationary), the model of the magnetic behaviour assuming that $$\frac{\partial B}{\partial t}=0$$

becomes false and the positioning information calculated by the filter becomes subject to errors.

To resolve this difficulty, it has been proposed to continue the modelling effort to include magnetic disturbances in the model, that is to say all of the considered equations.

In particular, in the document "Navigation Magnéto-Inertielle—Principes et application à un système podométrique indoor", Éric DORVEAUX, Thesis of the 10 Nov. 2011 at the Ecole Nationale Supérieure des Mines de Paris, the idea has been described of using the Maxwell-Faraday equation to model all of these magnetic disturbances by the rotational of the electric field. The link between the dynamic of the magnetic field and the rotational of the electric field E then modifies the equation of the behaviour of the magnetic field in $\dot{B}=-\Omega\wedge B+\nabla B\cdot V-\vec{\mathrm{rot}}\,E$ The preceding equation is true in all circumstances, but has the drawback of requiring sensors making it possible to measure the electric field.

Alternatively, it has been proposed to model a part only of the magnetic disturbances. This is the case of modelling magnetic disturbances linked to the electricity distribution network (see document "Motion estimation of a rigid body with an EKF using magneto-inertial measurements", Charles-Ivan Chesneau, Indoor Positioning and Indoor Navigation (IPIN), 2016 International Conference on Indoor Positioning and Indoor Navigation). It will indeed be recalled that the current that circulates in all the electric lines oscillates at a frequency of 50 Hz. This is also the case of the modelling of small magnetic disturbances in the form of magnetic dipoles according to a method described in "Compensation Method of Small Magnetic Disturbance in Heading by Gradient Measurement in a Magnetic Compass", Jouy et al., Accepted to appear in European Magnetic Sensors and Actuators Conference 2017.

Such techniques for modelling a known part of the disturbances provide satisfaction, but are only efficient against a certain number of predefined disturbances. They do not make it possible to take into account unexpected disturbances for example linked to the movement of metal objects of various forms.

It would be desirable to have available a new magneto-inertial navigation method by measurement of the magnetic field gradient which can process in a universal and efficient manner all magnetic disturbances, and not requiring additional sensors.

DESCRIPTION OF THE INVENTION

The present invention thus relates, according to a first aspect, to a method for estimating the movement of an object moving in an ambient magnetic field, the method being characterised in that it includes the steps of:

(a) Acquisition:
  by magnetic measurement means fixed with respect to said object, of at least one component of the magnetic field and/or an i-th derivative of the magnetic field, at the magnetic measurement means;
  by measurement means other than magnetic fixed with respect to said object, of at least one item of information representative of the movement of the object;

(b) Evaluation by data processing means of the stationary or otherwise character of the magnetic field at the magnetic measurement means;
(c) Estimation by the data processing means of at least one component of the movement of said object using,
   at least one equation other than magnetic linking said component of the movement of said object and the at least one acquired item of information representative of the movement of the object;
   depending on the result of said evaluation of the stationary or otherwise character of the magnetic field at the magnetic measurement means, at least one magnetic equation linking said component of the movement of said object and the at least one acquired component of the magnetic field and/or an i-th derivative of the magnetic field.

According to other advantageous and non-limiting characteristics:
   the magnetic measurement means include a plurality of gradiometers and/or magnetometers organised into triaxes, each triaxis being associated with a spatial position;
   the magnetic equation(s) are of the form $\nabla_n \dot{B} = f_n(\Omega) \cdot \nabla_n B + g_n(\nabla_{n+1} B) \cdot V$, where $\nabla_n B$ is an n-th derivative of the magnetic field, $\Omega$ the instantaneous angular velocity, V the instantaneous linear velocity, and $f_n$ and $g_n$ predetermined functions;
   the magnetic equation is $\dot{B} = -\Omega \times B + \nabla B \cdot V$;
   said measurement means other than magnetic are inertial measurement means, such that said acquired information representative of the movement of the object is at least one component of an acceleration and/or an angular velocity of the object;
   said at least one equation other than magnetic is an inertial equation linking said component of the movement of said object and the at least one acquired component of an acceleration and/or an angular velocity of the object;
   step (a) includes the acquisition by the inertial measurement means of three components of the acceleration of the object and three components of the angular velocity of the object;
   step (b) includes the calculation of a parameter representative of the stationary or otherwise character of the magnetic field at the magnetic measurement means, the contribution of the at least one magnetic equation in step (c) being a function of said parameter representative of the stationary or otherwise character of the magnetic field at the magnetic measurement means;
   step (b) includes the calculation of the innovation of a state observer, said parameter representative of the stationary or otherwise character of the magnetic field at the magnetic measurement means being a function of said innovation;
   said parameter representative of the stationary or otherwise character of the magnetic field at the magnetic measurement means is the difference between the theoretical trace of the covariance matrix of the innovation, and the estimated trace of the covariance matrix of the innovation;
   step (c) includes the implementation of a state observer to estimate a state including said at least one component of the movement of said object, the contribution of said at least one magnetic equation being controlled via a gain of said state observer;
   the state observer implemented at step (c) is the state observer used at step (b).

According to a second aspect, the invention relates to an equipment for estimating the movement of an object moving in an ambient magnetic field, characterised in that it includes data processing means configured to implement:
   A module for receiving:
      at least one component of the magnetic field and/or an i-th derivative of the magnetic field, acquired by magnetic measurement means fixed with respect to said object,
      at least one component of an item of information representative of the movement of the object, acquired by measurement means other than magnetic fixed with respect to said object,
   a module for evaluating the stationary or otherwise character of the magnetic field at the magnetic measurement means;
   a module for estimating at least one component of the movement of said object using,
      at least one equation other than magnetic linking said component of the movement of said object and the at least one acquired item of information representative of the movement of the object;
      depending on the result of said evaluation of the stationary or otherwise character of the magnetic field at the magnetic measurement means, at least one magnetic equation linking said component of the movement of said object and the at least one acquired component of the magnetic field and/or an i-th derivative of the magnetic field.

According to other advantageous and non-limiting characteristics:
   The equipment is a case including the magnetic measurement means and the measurement means other than magnetic;
   The equipment is a mobile terminal or a server, suited for communicating with a case including the magnetic measurement means and the measurement means other than magnetic.

According to a third aspect, the invention relates to a system including the equipment according to the second aspect of the invention and at least one connected case.

According to a fourth and a fifth aspect, the invention relates to a computer programme product including code instructions for the execution of a method for estimating the movement of an object moving in an ambient magnetic field according to the first aspect of the invention; and a storage means readable by a computer equipment on which a computer programme product includes code instructions for the execution of a method for estimating the movement of an object moving in an ambient magnetic field according to the first aspect of the invention.

DESCRIPTION OF THE FIGURES

Other characteristics and advantages of the present invention will become clear on reading the description that follows of a preferential embodiment. This description will be given with reference to the appended drawings in which.

DETAILED DESCRIPTION

Principle

The present method proposes, rather than combining the two types of models (inertial and magnetic) into a single model, using adaptive filtering techniques making it possible to modify the impact of the magnetic equation in the global filtering model. More precisely, the "simplified" magnetic equation $\dot{B}=-\Omega \wedge B+\nabla B \cdot V$ is kept (or any other derivative of this equation, of the form $\nabla_n \dot{} B = f_n(\Omega) \cdot \nabla_n B + g_n(\nabla_{n+1} B) \cdot V$, where $\nabla_n B$ is an n-th derivative of the magnetic field, and $f_n$ and $g_n$ predetermined functions, see the application FR1756675) but its impact in the event of disturbance is limited or even eliminated.

To do so, as will be seen a criterion is used making it possible to:

detect that the system is in the presence of a magnetic disturbance and thereby reduce the impact of the magnetic equation(s) in the model, and detect the end of the magnetic disturbance and thereby re-increase the impact of the magnetic equation(s).

Architecture

Figure 1:
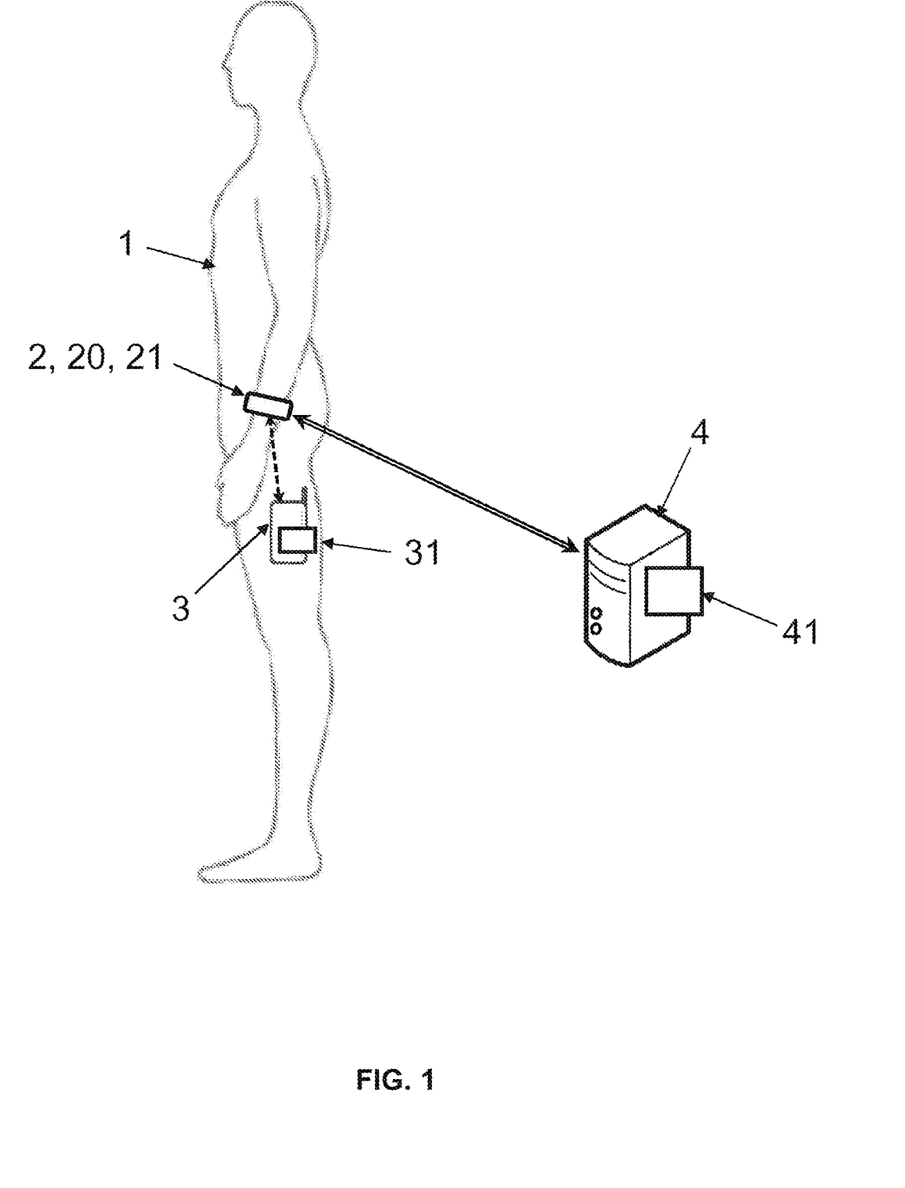
FIG. 1 is a diagram of equipment for the implementation of the method according to the invention.

With reference to FIG. 1, the present method enables the estimation of the movement of an object 1 moving in an ambient magnetic field (typically the Earth's magnetic field, which could be slightly altered by metal objects or nearby electric currents), noted $\vec{B}$. As already explained, the magnetic field is a vector field in three-dimensional space, that is to say associating a vector of three dimensions with each three-dimensional point in which the object is moveable.

This object 1 may be any moveable object of which knowledge of the position is desired, for example a wheeled vehicle, a drone, etc., but also a person or a part of the body of this person (his hands, his head, etc.).

The object 1 is equipped with magnetic measurement means 20, which are magnetometers and/or gradiometers. More precisely, instead of measuring the value of the components of the magnetic field $\vec{B}$ the latter measure directly the value of the components of the magnetic field gradient $\vec{B}$, i.e. the value of the spatial derivatives. Such magnetic gradiometers 20 are known to those skilled in the art. According to certain embodiments of the invention, gradiometers measuring directly the value of the second derivatives (second order gradient), and generally speaking i-th derivatives (i-th order gradient), could be used.

In the remainder of the description, the example of magnetometers will be taken but those skilled in the art will know how to transpose it to gradiometers.

The magnetometer(s) 20 are "axial", that is to say capable of measuring a component of said magnetic field, i.e. the projection of said magnetic field $\vec{B}$ along their axis (or in the case of a gradiometer a component of an i-th order spatial derivative of said magnetic field, i.e. the variation in a component of $\nabla^{i-1} B$ at said gradiometer along their axis).

Advantageously, the magnetometers 20 are at least 3n+3 in number, advantageously organised by groups of three into "triaxes", i.e. a triplet of magnetometers 20 two by two orthogonal associated with the same spatial position and measuring the magnetic field along the three axes.

In a preferred manner, the orthonormal point of reference associated with the object is chosen by convention (and by facility for the remainder of the present description) such that the triaxes are advantageously oriented in accordance with said orthonormal point of reference, so as to further facilitate the calculations.

But those skilled in the art will know how to transpose it in all cases to any spatial arrangement of gradiometers/magnetometers.

The object 1 is also equipped with measurement means other than magnetic 24, in particular inertial measurement means, even if other types of sensors could be used such as a camera, potentially in combination. In the remainder of the description, the preferred embodiment with inertial measurement means will be considered.

Such means are widely known to those skilled in the art and typically constitute an inertial unit including at least an accelerometer and/or a gyrometer, in a preferred manner three accelerometers and three gyrometers, also arranged in triaxis. Gyrometers measure the instantaneous angular velocity of the inertial unit with respect to the terrestrial reference frame, noted $\vec{\Omega}$. Accelerometers are sensitive to external forces other than gravitational applied to the sensor, and make it possible to measure an acceleration noted $\vec{\gamma}$.

The magnetic and non-magnetic (inertial) measurement means 20, 24 are fixed with respect to the object 1, i.e. they have a movement substantially identical in the terrestrial reference frame (it can be also said that the measurement means 20, 24 are integral with the object 1). In a preferred manner, the reference frame of the object 1 is provided with an orthonormal cartesian point of reference in which the coordinates are noted $(x_1, x_2, x_3)$, the magnetometers 20 thus have a predetermined position in this point of reference.

Figure 2:
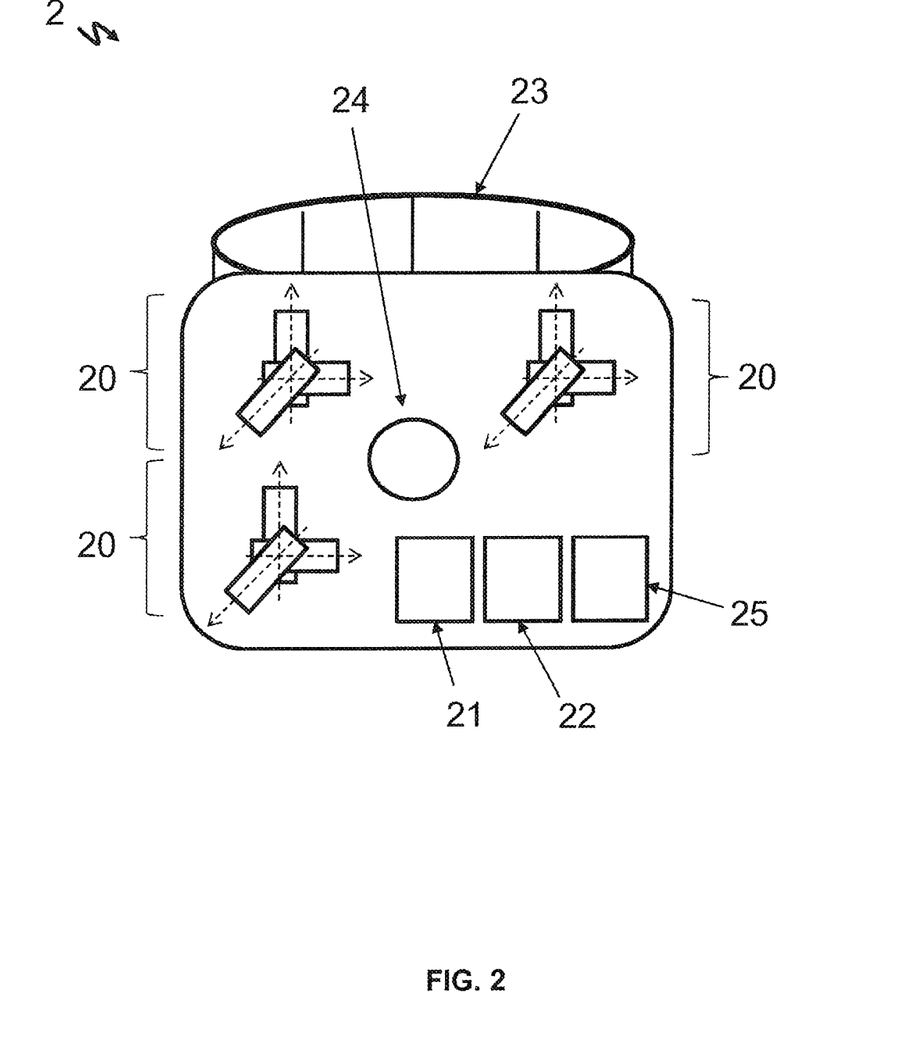
FIG. 2 represents in greater detail an example of case for the implementation of the method according to the invention.

The magnetic and non-magnetic (inertial) measurement means 20, 24 are preferentially those of a case 2 such as represented in FIG. 2 having (for example if the object 1 is a person) means 23 for attachment to the object 1 (for example the wrist or the hand). These attachment means 23 consist for example of a bracelet, for example a self-gripping strap that grips the limb and enables a fixed connection. It will clearly be understood that the invention is not limited to the estimation of the movement of a person, but it is particularly advantageous in such a use because it enables very reduced bulk, which is necessary for the case to be portable by a human in an ergonomic manner.

The case 2 may include processing means 21 (typically a processor) for implementing directly in real time the processing operations of the present method, or instead the measurements may be transmitted via communication means 25 to an external device such as a mobile terminal (smartphone) 3, or even a remote server 4, or instead the measurements may be recorded in local data storage memory means 22 (a flash type memory for example) for a posteriori processing for example on the server 4.

The communication means 25 may implement a short range wireless communication, for example Bluetooth or Wi-Fi (in particular in an embodiment with a mobile terminal 3) or even be means for connecting to a mobile network (typically UMTS/LTE) for a long distance communication. It should be noted that the communication means 25 may be for example a wired connection (typically USB) for transferring data from the local data storage means 22 to those of a mobile terminal 3 or a server 4.

If it is a mobile terminal 3 (respectively a server 4) that hosts the "intelligence", it includes processing means 31 (respectively 41) such as a processor for implementing the processing operations of the present method that are going to be described. When the processing means used are those 21 of the case 2, it may further include communication means 25 for transmitting the estimated position. For example, the position of the bearer may be sent to the mobile terminal 3 to display the position in a navigation software interface.

In the remainder of the present description, it will be seen that the data processing means 21, 31, 41 respectively of the case 2, a smartphone 3 and a remote server 4 may indifferently and according to the applications carry out all or part of the steps of the method.

Method

In a first step (a), the method includes the acquisition (in particular in a reference frame of the object 1) of two types of data:
- by the magnetic measurement means 20 (the gradiometer(s)/magnetometer(s)) fixed with respect to said object 1, of a component:
  of the magnetic field and/or
  of at least one i-th derivative of said magnetic field $\vec{B}$, with one or more values i>1 (as explained, various gradiometers/magnetometers may be used so as to measure various orders of derivatives or directly the values of the magnetic field).
- by the measurement means other than magnetic (24) fixed with respect to said object 1:
  of at least one item of information representative of the movement of the object. It will be understood that this information may be of numerous types: inertial data, images, depth information, etc.

In particular, in the preferred inertial case there is the acquisition:
- by the inertial measurement means 24 fixed with respect to said object 1, of at least one component:
  of the acceleration and/or
  of the angular velocity of the object 1 (preferentially three components of the angular velocity, and three components of the acceleration).

These quantities are advantageously measured with a dt sampling (i.e. every "dt" seconds) with dt very small compared to the characteristic time of the movements of the object 1, typically 40 ms.

In a step (b), the data processing means 21, 31, 41 evaluate the stationary or otherwise character of the magnetic field at the magnetic measurement means 20. As explained, it involves simply detecting if one is in the presence of magnetic disturbances or not, without seeking to correct them. The stationary character is representative of the relevance of the magnetic model.

This step (b) sees the calculation of a parameter (either Boolean, or a discrete or continuous numerical value) representative of the stationary or otherwise character of the magnetic field.

In a first embodiment, it is possible to obtain directly a Boolean information, for example with a dedicated magnetic sensor having a predetermined sensitivity threshold.

In a second embodiment, said parameter representative of the stationary or otherwise character is a physical quantity having a numerical value (it is possible for example to calculate an order of magnitude $$\frac{\partial B}{\partial t},$$

other preferred examples will be given hereafter), if needs be "processed" (in step (c) or directly in step (b)) and in particular compared to one or more reference thresholds. For convenience, reference will be made in the present description of "raw" parameter and if needs be of "processed" parameter if step (b) includes the application of any function such as a thresholding to the value of the parameter, but they could be used indifferently in step (c). Those skilled in the art will understand that the present invention is not limited to any type of parameter in particular and to any manner of manipulating them.

More precisely, if there is a single threshold, it is equivalent to a Boolean parameter: either the magnetic field is sufficiently stationary (the threshold is not exceeded) so that the magnetic model is relevant, or it is not sufficiently stationary (the threshold is exceeded) and then the magnetic model is no longer relevant. If there are several thresholds, discrete values are obtained, and the processed parameter constitutes some kind of "level of stationarity". For example, it is possible to have k increasing thresholds (numbered from 1 to k, k≥2), and k+1 values of processed parameter:
- if the value of the raw parameter is below the first threshold, the processed parameter has for value "0" (i.e. the stationarity is maximum);
- if the value of the raw parameter is above the k-th threshold, the processed parameter has for value "k" (i.e. the stationarity is minimum—the disturbances are maximum);
- the value of the raw parameter is between the i-th threshold and the i+1-th threshold (i∈〚1; k−1〛), the processed parameter has for value "I" (i.e. the stationarity is intermediate).

Instead of having a parameter with value in 〚0; k〛, those skilled in the art could choose any scale of their choice, for example dividing the above value by k so that the processed parameter is a level with value in the interval [0; 1].

It should be noted that there is not necessarily thresholding, the raw value being able to be used as such as parameter representative of the stationary or otherwise character of the magnetic field. As explained before, one may seek directly to evaluate an order of magnitude of $$\frac{\partial B}{\partial t},$$

but alternatively one may seek to detect the consequences of a potential non-stationarity and thereby seek to identify directly a disturbance of the model via the calculation of other parameters representative of the stationary or otherwise character of the magnetic field, of which examples will be seen.

Those skilled in the art will know how to carry out such an evaluation, but very advantageous techniques within the scope of the present invention will be described hereafter.

In an arbitrary manner (as described above, and it will be seen that this coincides with the examples that will be described), when the parameter is a numerical value, one may decide that the closer the value of said parameter is to zero, the more the magnetic field has a stationary character, but the complete opposite could be chosen.

In a step (c), the data processing means 21, 31, 41 estimate at least one component of the movement of the object 1, in particular all the components of the linear velocity V. One or more components of the angular velocity vector Ω may also be estimated or at the least verified. Alternatively, the estimated component(s) could be the components of the position, and/or the orientation, according to the sought after applications. In a preferred manner, six components of the movement will be estimated (in particular the three components of the position and the three components of the orientation).

This estimation is made using:

at least one equation other than magnetic (i.e. not linking the components of the magnetic field or one of its derivatives) linking said component of the movement of said object 1 and the at least one acquired item of information representative of the movement of the object (that is to say in particular at least one inertial equation linking said component of the movement of said object 1 and the at least one acquired component of an acceleration and/or an angular velocity of the object 1);

according to the calculated value of the parameter representative of the stationary or otherwise character of the magnetic field at the magnetic measurement means 20, at least one magnetic equation linking said component of the movement of said object 1 and the at least one acquired component of the magnetic field and/or an i-th derivative of the magnetic field.

More precisely, the contribution of the magnetic equation(s) is variable and is subordinate to the relevance of the magnetic model: if the magnetic field is not evaluated sufficiently stationary, the contribution of these magnetic equations will be reduced or even eliminated to conserve the relevance of the global model.

If the parameter representative of the stationary character of the magnetic field calculated at step (b) is Boolean, the contribution is itself Boolean: either the parameter is representative of a stationary character and one uses the magnetic equations, or it is representative of a non-stationary character and one does not use them.

If the parameter representative of the stationary character of the magnetic field calculated at step (b) is a numerical value, the contribution of the at least one magnetic equation will be a function of (and optionally inversely proportional to) the value of this parameter, that is to say that the contribution may be variable according to the level of stationarity, in particular the higher the parameter the lower the contribution. For example, if the preceding example is taken, the parameter has k values which are levels tin [0; 1], then the contribution may be given by the value (1−t); if t=0 (maximum level of stationarity), the magnetic equations are used at 100%, if t=1 (minimum level of stationarity), the magnetic equations are used at 0% (i.e. eliminated).

For convenience, reference will be made to a first system making it possible to provide a positioning information other than magnetic (in particular as explained a first system of at least one inertial equation, but it will be understood that other equations complementary to the magnetic equations could be used, for example equations concerning images in the case of visual navigation), and a second system of at least one magnetic equation. "Unified system" is taken to mean a system of all the equations of the first and second systems.

It will be noted that the equations of each of the systems either involve directly the component(s) of the sought after movement, or derivatives thereof (for example the angular velocity if the orientation is sought).

As regards the first system, one has generally speaking a dynamic model of one or more equations of the form:

$$\frac{dX}{dt} = f(X, \text{measurements}),$$

where X represents a component of the movement (as explained orientation, acceleration, velocity, position, etc.) and measurements represents the data acquired by the inertial measurement means 24.

For example, it is possible to take the first system $$\begin{cases} \dot{R} = \Omega R \\ \dot{V} = -\Omega \wedge V + \gamma + R \cdot g' \end{cases}$$

where R is the orientation of the object 1.

As regards the second system, as explained it is possible to take one or more equations of the form $\nabla_n \cdot B = f_n(\Omega) \cdot \nabla_n B + g_n(\nabla_{n+1} B) \cdot V$, and advantageously the equation $\dot{B} = -\Omega \wedge B + \nabla B \cdot V$.

It should be noted that it is always possible to model a part of the magnetic disturbances in the second system as mentioned previously (disturbances linked to the electricity distribution network, small magnetic disturbances in the form of magnetic dipoles, etc.) so that the presence of these "manageable" disturbances does not require reducing or eliminating the contribution of the mathematical equations, i.e. that only "non-modellable" disturbances lead to the evaluation of the magnetic field as non-stationary.

Filtering

Step (c) may advantageously be implemented via a standard filtering strategy consisting in using the data sensors (means 20, 24) to calculate an estimated state representative of the real state. In our case, the state obviously contains movement information, the prediction and resetting steps are conventional steps of an implementation of filter that use inertial equations and magnetic equations, and the gains are adjusted so that the filter converges.

To do so, any state observer may be used (that is to say a filter, in particular a linear state estimator filter such as a Luenberger filter, a Kalman filter, etc., or non-linear filter such as an extended Kalman filter, an invariant observer, etc.). In the present description, the example will be taken of the extended Kalman filter (EKF), but those skilled in the art will know how to transpose it to other filters.

In an extended Kalman filter, the state is represented by a vector for example of dimension n which includes the orientation and the position. It is possible to add other states to this vector to improve the estimation, for example the bias of the sensors. A covariance matrix is used to estimate the covariance between each state of the filter, it is of dimension $n^2$. The Kalman filter is carried out in two steps, a prediction step and an updating step. During the updating, gains are then adjusted automatically as a function of the covariance, dynamic and measurement matrices (alternatively, it is possible to construct a non-linear observer of which the gains are adjusted by hand).

The updating of the covariance matrix is based on the hypothesis that the errors due to the sensors and to the approximations are modelled for example as a noise of Gaussian distribution.

In a preferred manner, step (b) of calculating the parameter representative of the stationary or otherwise character of the magnetic field at the magnetic measurement means 20 is also obtained by filtering, generally simultaneously with the estimation of the movement of the object 1 (i.e. steps (b) and (c) are simultaneous, and more precisely implemented in a concomitant manner over time: the stationary character of the magnetic field is evaluated over time, which also makes it possible to detect the appearances of disturbances and their disappearances. It will be understood that alternatively verifications may be made periodically.

To do so, step (b) includes in a preferred manner the calculation of the innovation of an state observer (again in particular a linear state estimator filter such as a Luenberger filter, a Kalman filter, etc., or non-linear filter such as an extended Kalman filter, an invariant observer, etc.), said parameter representative of the stationary or otherwise character of the magnetic field at the magnetic measurement means 20 being a function of the innovation. Indeed, the innovation of a measurement in a state observer is representative of the coherence of this measurement with the filtering model. It is thus possible to use it to detect the presence of magnetic disturbances and thus non-stationarity (which can be translated by the fact that the magnetic equation is not in agreement with the magnetic measurements).

Figure 3A:
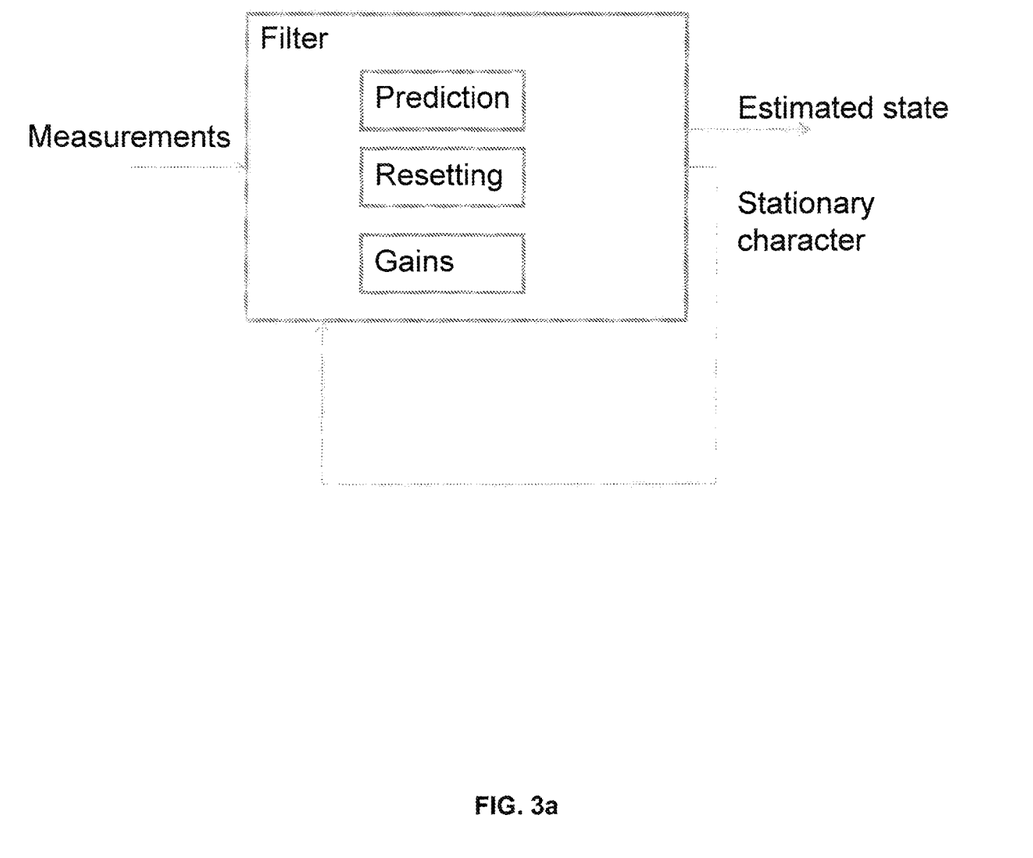
FIGS. 3a and 3b represent various state observers used in embodiments of the method according to the invention.

According to a first embodiment, the observer used for step (c) is simply used. With reference to FIG. 3a, one has in this embodiment a single filter with two outputs (the estimated state and the parameter representative of the stationary or otherwise character of the magnetic field at the magnetic measurement means 20, based on the innovation of the observer). It is during the resetting step that the observer supplies the innovation.

For example, if the covariance of the innovation is estimated recursively using a low pass filter:
$\hat{S}[k]=(1-a)\hat{S}[k-1]+\alpha \tilde{y}[k]\tilde{y}[k]^T$, where $\tilde{y}[k]$ is the innovation vector at the iteration k (such that $\tilde{y}[k]\tilde{y}[k]^T$ is the covariance of the innovation) and $\hat{S}[k]$ is the filtered estimation of the covariance of the innovation at the iteration k, and $0<\alpha<1$ is a parameter for adjusting the cut-off frequency of the filter.

The theoretical covariance of the innovation (theorical in the sense "expected if the filtering model was perfect") is an output of the Kalman filtering in discrete time: if $P[k|k-1]$ denotes the covariance of the predicted state error, $R[k]$ the measurement noise covariance matrix and $H[k]$ the Jacobean matrix of the measurement function with respect to the state, then:

$$S[k]=R[k]+H[k]P[k|k-1]H[k]^T$$

In theory, if the model was perfect, one would have:

$$E[\text{trace}(\hat{S}[k])-\text{trace}(S[k])]\approx 0$$

It is possible to use $\text{trace}(\hat{S}[k])-\text{trace}(S[k])$ or any other parametric function of $\hat{S}[k]$ or of its sequence as parameter representative of the stationary or otherwise character of the magnetic field ($\hat{S}[k]$, a sub-matrix of $\hat{S}[k]$, its trace or the distance between these values and those derived from $S[k]$ notably.

It should be noted that it is possible in all cases to use a simple low-pass filtering at the time of the innovation $\tilde{S}[k]$ to characterise the stationary or otherwise character of the magnetic field.

Figure 3B:
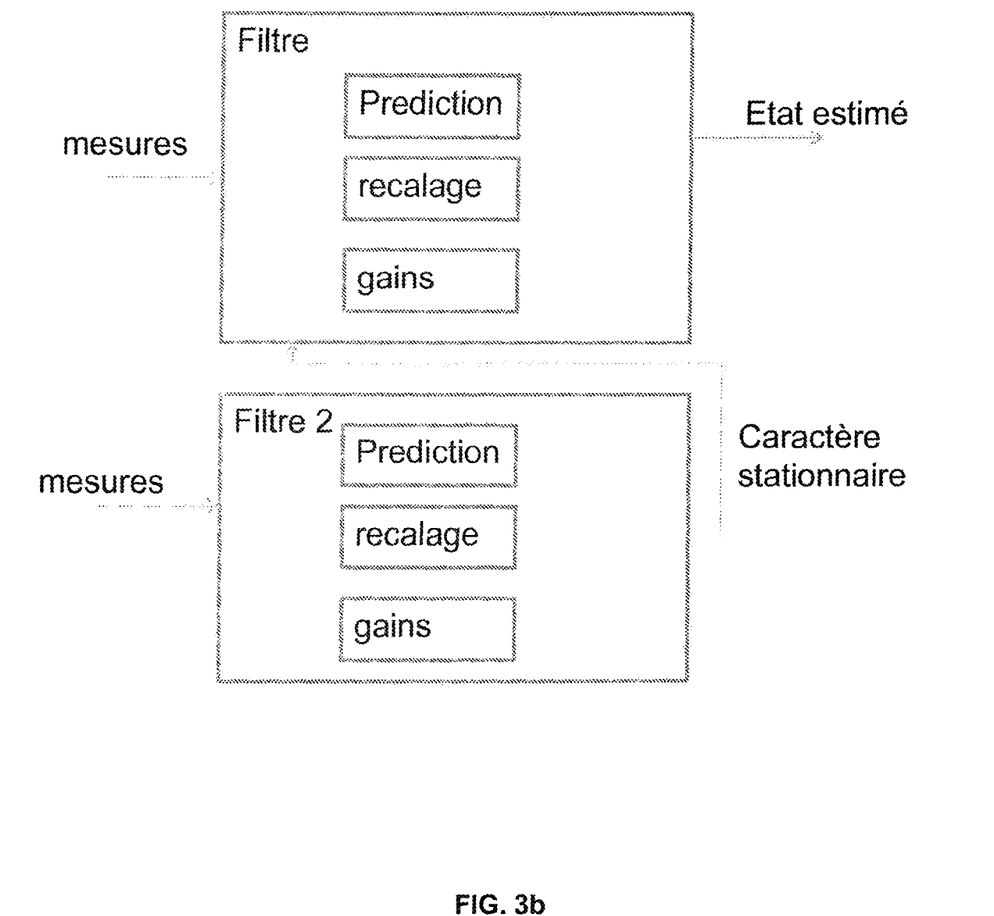

According to a second embodiment, step (b) includes the use of a dedicated state observer. Indeed it is possible to construct a state observer based on the same equations or a small part of the same equations having for unique aim to calculate a relevant item of information of the magnetic model. It is thereby possible to take for example the filter described in the document "Combining Inertial Measurements and Distributed Magnetometry for Motion Estimation", Eric Dorveaux, Thomas Boudot, Mathieu Hillion, Nicolas Petit, 2011 American Control Conference on O'Farrell Street, San Francisco, Calif., USA (which only contains a part of the inertial equations), or a more complete filter. This state observer makes the hypothesis of the stationarity of the magnetic field, and one uses again the innovation of this state observer to evaluate this hypothesis and to deduce therefrom the relevance of the magnetic model (see FIG. 3b).

Contribution of the Magnetic Model

Once the stationary or otherwise character of the magnetic field has been evaluated (i.e. once the relevance of the magnetic model has been quantified), it is possible to modify the impact of the second system (magnetic equations) in the state observer in such a way as to reduce the impact of the magnetic disturbances. A plurality of embodiments is possible.

According to a first quite radical embodiment mentioned above, the use of the second system of equations is completely eliminated (i.e. the unified system is reduced to the first system) for the time of the disturbance, to cancel its impact. To do so, it suffices to no longer use these magnetic equations at step (c) if the parameter representative of the stationary character of the magnetic field is characteristic of a non-stationarity (i.e. value above a predetermined threshold).

Alternatively, according to a second embodiment, the gain of the state observer that performs the estimation of the movement at step (c) is adapted. For example, if the state observer is a linear Kalman filter or an extended Kalman filter of which the state contains the magnetic field B, this involves a modification of the dynamic noise matrix of the magnetic equation.

If $\text{trace}(\hat{S}[k])-\text{trace}(S[k])$ is used as parameter representative of the stationary or otherwise character of the magnetic field, it is possible to add to the normal dynamic covariance a term $p[k]$ changing with the following dynamic:

$$p[k+1]=\max(p_0,p[k]+\lambda(\text{trace}(\hat{S}[k])-\text{trace}(S[k])), \text{ where } \lambda>0.$$

High values of $p_0$ imply high values of $S[k]$, that is to say that the adjustment parameter is only changed when trace $(\hat{S}[k])$ reaches a certain threshold. This approach avoids acting on the whole model.

A third embodiment consists in making the resetting gain K linked to the magnetic equations coming from a Kalman filter (or from any linear filter) inversely proportional to the parameter representative of the stationary or otherwise character of the magnetic field. The more the model is relevant (i.e. the more the parameter representative of the stationary character of the magnetic field is close to zero), the higher the resetting gain.

Equipment and System

According to a second aspect, the invention relates in particular to the equipment 2, 3, 4 for the implementation of one or the other of the embodiments of the method.

As explained previously, according to a first embodiment the equipment is an autonomous case 2 including the magnetic measurement means 20, the measurement means other than magnetic (inertial) 24, and the data processing means 21 configured for the implementation of the steps of the method.

The case 2 further includes means for attaching 23 the case 2, and if needs be data storage means 22 (for the storage for example of the estimated movements) and/or communication means 25 for the exportation of the results.

According to a second embodiment, the equipment is a mobile terminal 3 or a server 4, suited for communicating with a case 2 including the magnetic and non-magnetic measurement means 20, 24. In other words, the terminal 3 or the server 4 includes the processing means 31 or 41 configured for the implementation of the steps of the method. Each case 2 may all the same include data processing means 21 for the control of the means 20, 24 and the transmission (via the communication means 25) of the measured data to the data processing means 31, 41.

It should be noted that if needed the steps of the method may be divided between the means 21, 31, 41.

The invention also relates to in this case the system including the equipment 3, 4 according to this embodiment and the connected "satellite" case(s) 2.

In all cases, the data processing means 21, 31, 41 of the "main" equipment 2, 3, 4 are configured to implement:

A module for receiving:
  at least one component of the magnetic field and/or an i-th derivative of the magnetic field (advantageously at least five), acquired by magnetic measurement means 20 fixed with respect to said object 1,
  at least one information component representative of the movement of the object 1, that is to say preferentially at least one component of an acceleration and/or an angular velocity of the object 1 (advantageously three components of the acceleration and three components of the velocity), acquired by measurement means other than magnetic (inertial) 24 fixed with respect to said object 1,
a module for calculating a parameter representative of the stationary or otherwise character of the magnetic field at the magnetic measurement means 20, calculating typically as explained the value of a parameter representative of the stationary or otherwise character of the magnetic field at the magnetic measurement means 20;
a module for estimating at least one component (advantageously three or even six) of the movement of said object 1 using,
  at least one equation other than magnetic linking said component of the movement of said object 1 and the at least one acquired item of information representative of the movement of the object 1 (in particular an inertial equation linking said component of the movement of said object 1 and the at least one acquired component of an acceleration and/or an angular velocity of the object 1);
  according to the calculated value of said parameter representative of the stationary or otherwise character of the magnetic field at the magnetic measurement means 20, at least one magnetic equation linking said component of the movement of said object 1 and the at least one acquired component of the magnetic field and/or an i-th derivative of the magnetic field.

Computer Programme Product

According to a third and a fourth aspect, the invention relates to a computer programme product including code instructions for the execution (on the processing means 21, 31, 41) of a method for estimating the movement of an object 1 moving in an ambient magnetic field according to the first aspect of the invention, as well as storage means readable by a computer equipment (for example data storage means 22) on which this computer programme product is found.

The invention claimed is:

1. A method for estimating movement of an object moving in an ambient magnetic field, the method comprising the steps of:

(a) Acquisition:
  by a magnetic measurement unit fixed with respect to said object, of at least one component of the magnetic field and/or an i-th derivative of the magnetic field, at the magnetic measurement unit;
  by a measurement unit other than magnetic fixed with respect to said object, of at least one item of information representative of the movement of the object;
(b) Calculation, by a data processor, of a parameter representative of a stationary or otherwise character of the magnetic field at the magnetic measurement unit;
(c) Estimation, by the data processor, of at least one component of the movement of said object using,
  at least one equation other than magnetic linking said component of the movement of said object and the at least one acquired item of information representative of the movement of the object;
  according to the calculated value of the parameter representative of the stationary or otherwise character of the magnetic field at the magnetic measurement unit, at least one magnetic equation linking said component of the movement of said object and the at least one acquired component of the magnetic field and/or an i-th derivative of the magnetic field.

2. The method according to claim 1, in which the magnetic measurement unit includes a plurality of gradiometers and/or magnetometers organised into triaxes, each triaxis being associated with a spatial position.

3. A non-transitory storage medium readable by a computer equipment, having stored thereon instructions for the execution of a method for estimating the movement of an object moving in an ambient magnetic field according to claim 1.

4. The method according to claim 1, in which the magnetic equation(s) are of the form $\nabla_n {}^* B = f_n(\Omega) \cdot \nabla_n B + g_n(\nabla_{n+1} B) \cdot V$, where $\nabla_n B$ is an n-th derivative of the magnetic field, $\Omega$ the instantaneous angular velocity, V the instantaneous linear velocity, and $f_n$ and $g_n$ predetermined functions.

5. The method according to claim 4, in which the magnetic equation is $\dot{B} = -\Omega \times B + \nabla B \cdot V$.

6. The method according to claim 1, in which:
said measurement unit other than magnetic is a inertial measurement unit, such that said acquired information representative of the movement of the object is at least one component of an acceleration and/or an angular velocity of the object;
said at least one equation other than magnetic is an inertial equation linking said component of the movement of said object and the at least one acquired component of an acceleration and/or an angular velocity of the object.

7. The method according to claim 6, in which step (a) includes the acquisition, by the inertial measurement unit, of three components of the acceleration of the object and three components of the angular velocity of the object.

8. The method according to claim 1, in which said parameter representative of the stationary or otherwise character of the magnetic field at the magnetic measurement unit is a numerical value, the at least one magnetic equation having a variable contribution in step (c) as a function of the calculated value of said parameter representative of the stationary or otherwise character of the magnetic field at the magnetic measurement unit.

9. The method according to claim 8, in which step (b) includes the calculation of an innovation of a state observer, said parameter representative of the stationary or otherwise character of the magnetic field at the magnetic measurement unit being a function of said innovation.

10. The method according to claim 9, in which said parameter representative of the stationary or otherwise character of the magnetic field at the magnetic measurement unit is the difference between the theoretical trace of the covariance matrix of the innovation, and the estimated trace of the covariance matrix of the innovation.

11. The method according to claim 8, in which step (c) includes the implementation of a state observer to estimate a state including said at least one component of the movement of said object, the contribution of said at least one magnetic equation being controlled via a gain of said state observer.

12. The method according to claim 11 in which step (b) includes the calculation of an innovation of a state observer, said parameter representative of the stationary or otherwise character of the magnetic field at the magnetic measurement unit being a function of said innovation and the state observer implemented at step (c) is a state observer used at step (b).

13. An equipment for estimating movement of an object moving in an ambient magnetic field, including a data processor configured to implement:

a module for receiving:

at least one component of the magnetic field and/or an i-th derivative of the magnetic field, acquired by a magnetic measurement unit fixed with respect to said object, at least one information component representative of the movement of the object, acquired by a measurement unit other than magnetic fixed with respect to said object, a module for calculating a parameter representative of the stationary or otherwise character of the magnetic field at the magnetic measurement unit;

a module for estimating at least one component of the movement of said object using, at least one equation other than magnetic linking said component of the movement of said object and the at least one acquired item of information representative of the movement of the object;

according to the calculated value of the parameter representative of the stationary or otherwise character of the magnetic field at the magnetic measurement unit, at least one magnetic equation linking said component of the movement of said object and the at least one acquired component of the magnetic field and/or an i-th derivative of the magnetic field.

14. The equipment according to claim 13, being a case including the magnetic measurement unit and the measurement unit other than magnetic.

15. The equipment according to claim 14, being a mobile terminal or a server, suited for communicating with a case including the magnetic measurement unit and the measurement unit other than magnetic.

16. A system including the equipment according to claim 15 and at least one connected case.

* * * * *